United States Patent
Yoo et al.

(10) Patent No.: US 8,368,344 B2
(45) Date of Patent: Feb. 5, 2013

(54) REFRIGERATOR AND OPERATING METHOD THEREOF

(75) Inventors: Jae Yoo Yoo, Seoul (KR); Chang Oh Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 12/593,528

(22) PCT Filed: Jan. 26, 2008

(86) PCT No.: PCT/KR2008/000494
§ 371 (c)(1),
(2), (4) Date: Jan. 21, 2010

(87) PCT Pub. No.: WO2008/120866
PCT Pub. Date: Oct. 9, 2008

(65) Prior Publication Data
US 2010/0145546 A1   Jun. 10, 2010

(30) Foreign Application Priority Data
Mar. 29, 2007   (KR) .......................... 10-2007-0031067

(51) Int. Cl.
*H02P 27/00* (2006.01)
*H02P 7/00* (2006.01)
*G05D 17/00* (2006.01)

(52) U.S. Cl. ......... 318/812; 318/479; 318/504; 700/298
(58) Field of Classification Search .................. 318/479, 318/504, 812; 700/298
See application file for complete search history.

(56) References Cited

U.S. PATENT DOCUMENTS

| | | | |
|---|---|---|---|
| 5,929,591 A * | 7/1999 | Katou et al. ................... | 318/723 |
| 6,014,004 A * | 1/2000 | Hamaoka et al. ............. | 318/778 |
| 6,337,548 B2 * | 1/2002 | Kawabata et al. ....... | 318/400.04 |
| 6,367,273 B2 * | 4/2002 | Takagi et al. .................... | 62/230 |
| 7,274,579 B2 * | 9/2007 | Ueda et al. ..................... | 363/125 |
| 2001/0035018 A1 * | 11/2001 | Takagi et al. ................ | 62/228.4 |
| 2006/0162427 A1 * | 7/2006 | Horie ............................. | 73/40.7 |
| 2008/0130336 A1 * | 6/2008 | Taguchi ........................ | 363/125 |
| 2009/0102405 A1 * | 4/2009 | Hwang et al. ............ | 318/400.15 |

FOREIGN PATENT DOCUMENTS

| KR | 20-1992-0005419 | 3/1992 |
|---|---|---|
| KR | 20-1997-0000248 | 1/1997 |

OTHER PUBLICATIONS

International Search Report dated May 23, 2008.

* cited by examiner

*Primary Examiner* — Walter Benson
*Assistant Examiner* — Gabriel Agared
(74) *Attorney, Agent, or Firm* — KED & Associates LLP (57) ABSTRACT

A refrigerator and a method of operating the same are disclosed. In the refrigerator and the method of operating the same, a voltage of an electric power input is measured and rectified through the half wave rectification or the full wave rectification in correspondence with the measured voltage, so that the refrigerator can be used without a voltage converting device when a voltage of the input power is changed. Therefore, the change or the modification of the circuit is not needed in order to use the refrigerator in other regions. Since components are compatible and utility of the components is improved, manufacturing costs can be reduced.

8 Claims, 6 Drawing Sheets

REFRIGERATOR AND OPERATING METHOD THEREOF

TECHNICAL FIELD

The present invention relates to a refrigerator and a method of operating the same, and more particularly, to a refrigerator in which an input power input to the refrigerator is differently rectified in correspondence with a voltage of an electric power input to the refrigerator so that compatibility of parts can be achieved, and a method of operating the same.

BACKGROUND ART

In general, a refrigerator is an apparatus for storing food at a low temperature, in which food to be stored is frozen or refrigerated in accordance with the state of food to be stored. The chilled air supplied into the refrigerator is generated by the heat exchange of a refrigerant and is continuously supplied into the refrigerator while repeatedly performing a cycle of compression-condensation-expansion-evaporation. The supplied chilled air is uniformly spread to the inside of the refrigerator by convection so that food in the refrigerator can be stored at a desired temperature. The refrigerator is configured such that the electric power supplied from the outside is rectified and smoothed and revolutions per minute (ROM) of a compressor is controlled through an inverter according to change of load.

Since, in the refrigerator, the rectification and the smoothing of the electric power is different according to the electric power supplied from the outside, a different circuit for an internal power supply is designed according to the input electric power. Due to this, since the refrigerator cannot be used in other place where the electric power supplied to the refrigerator is different, a user must buy a new refrigerator and manufactures must design different power supply circuits suitable to regions where the refrigerators are used to manufacture.

DISCLOSURE OF INVENTION

Technical Problem

In order to solve the above-described problems, it is an object of the present invention to provide a refrigerator in which an input power is differently rectified in correspondence with a voltage of the input power supplied to the refrigerator such that the refrigerator can be configured with same components without change and modification of a power supply circuit according to the input power and compatibility of the components can be achieved, and a method of operating the refrigerator.

Technical Solution

In order to achieve the object, a refrigerator includes: a voltage detecting unit for measuring a voltage of an input power; a rectifying and smoothing unit for rectifying and smoothing the input power; a switch unit connected to the rectifying and smoothing unit and for changing a current flow through the rectifying and smoothing unit; and a controller for controlling the switch unit in correspondence with a magnitude of the voltage measured by the voltage detecting unit such that the input power is rectified through the full wave rectification or the half wave rectification.

The controller compares the magnitude of the voltage of the input power input from the voltage detecting unit with a preset reference voltage; controls the switch unit such that input power is rectified through the full wave rectification when the magnitude of the voltage of the input power is greater than the reference voltage; and controls the switch unit such that the input power is rectified through the half wave rectification when the magnitude of the voltage of the input power is less than the reference voltage.

In order to achieve the object, a method of operating a refrigerator including a rectifying and smoothing unit for rectifying and smoothing an input power, and inverter, and a compressor, the method includes: measuring a voltage of the input power to compare the measured voltage with a preset reference voltage; rectifying the input power through the full wave rectification and smoothing the rectified input power when the voltage of the input power is greater than the reference voltage; rectifying the input power through the half wave rectification and smoothing the rectified input power when the voltage of the input power is less than the reference voltage; and converting the rectified and smoothed input power by the inverter to be supplied as a driving power to the compressor.

BEST MODE FOR CARRYING OUT THE INVENTION

Hereinafter, embodiments of the present invention will be described with reference to the accompanying drawings.

Figure 1:
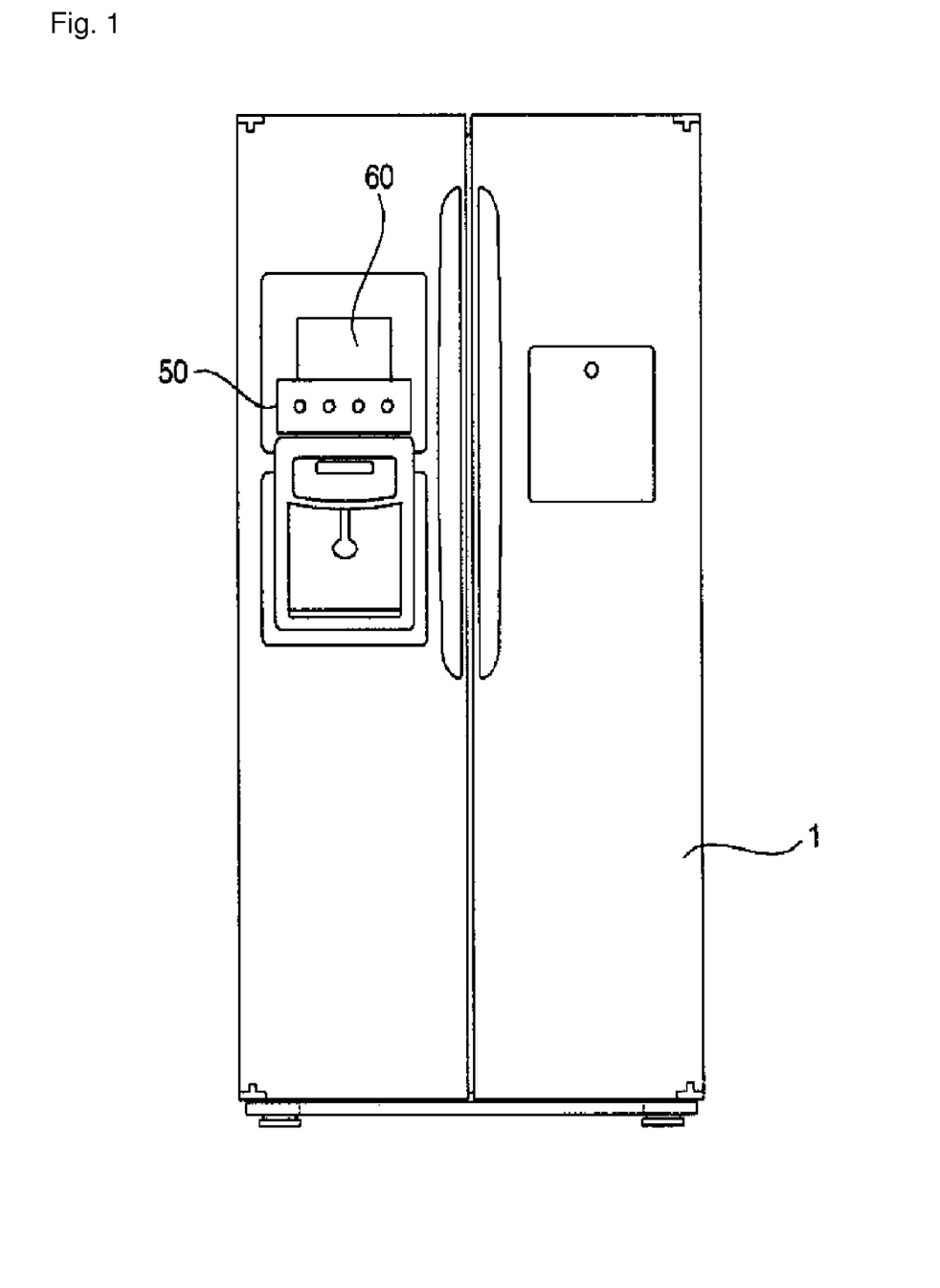
FIG. 1 illustrates a refrigerator according to an embodiment of the present invention.

FIG. 1 illustrates a refrigerator according to an embodiment of the present invention.

As illustrated in FIG. 1, a refrigerator 1 includes a freezer compartment, a refrigerator compartment. The refrigerator, in order to supply chilled air into the freezer compartment and the refrigerator compartment, includes a compressor, a heat-exchanger, a heater for defrosting the heat-exchanger, and a blowing fan. A plurality of devices including the compressor for supplying the chilled air is provided in correspondence with the numbers of the freezer compartment and the refrigerator compartment of the refrigerator 1. The refrigerator 1 includes a plurality of temperature sensor for detecting temperatures of the freezer compartment and the refrigerator compartment and for measuring temperature of ambient air, an input unit 50 to which refrigerating and freezing conditions are input, a display 60 for displaying operating states including compartment temperatures of the refrigerator 1, and a controller for controlling the refrigerator according to the input conditions.

The controller drives the compressors, the evaporators, the heaters, and the blowing fans so that the chilled air is supplied to the freezer compartments and the refrigerator compartments in accordance with the input conditions to control the operations thereof in accordance with temperatures input through the plurality of temperature sensors.

Figure 2:
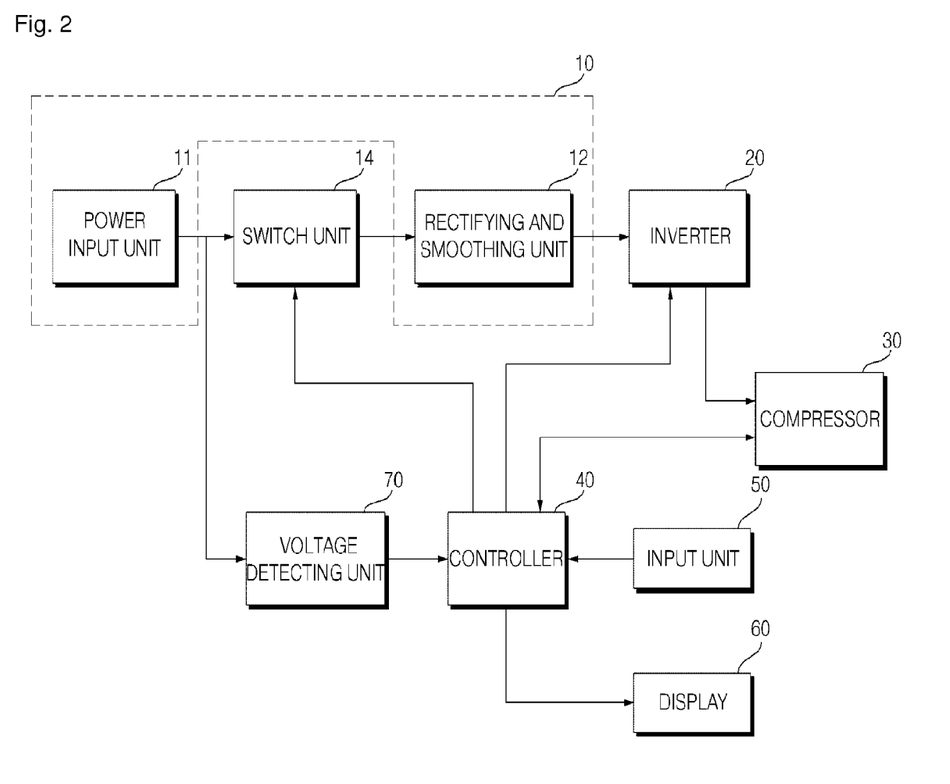
FIG. 2 is a block diagram illustrating the structure of the refrigerator according to an embodiment of the present invention.

FIG. 2 is a block diagram illustrating the structure of the refrigerator according to an embodiment of the present invention.

As illustrated in FIG. 2, the refrigerator 1 includes a heat-exchanger having the compressor, a heater, and a power supply 10 for supplying a driving electric power to a blowing fan. The power supply 10 includes a power input unit 11 to which an external AC power is input, and a rectifying and smoothing unit 12 for rectifying the input AC power through the half wave rectification or the full wave rectification and for smoothing the input AC power.

Moreover, the refrigerator 1 includes an inverter 20 for converting a DC power rectified and smoothed by the rectifying and smoothing unit 12 in response to a switching control signal input from the controller 40, a compressor 30 driven by a driving power received from the inverter 20, a voltage detecting unit 70 for measuring a voltage of the input power input from the power input unit 11 of the power supply 10, and a switch unit 14 for changing a current flow of the rectifying and smoothing unit 12 in accordance with a control command of the controller 40. The controller 40 controls the switch unit 14 in correspondence with a magnitude of a voltage input from the voltage detecting unit 70.

The refrigerator 1, as described above, includes the input unit 50 and the display 60, and further includes a data unit to which data for controlling the refrigerator is stored. Hereinafter, the structure that makes the subject matter of the present invention vague will be omitted from the drawings and the detailed description.

The inverter 20 re-converts the DC power converted by the rectifying and smoothing unit 12 into the AC power to apply the re-converted AC power to the compressor 30 such that the compressor 30 is driven. The inverter 20 is operated by a switching control signal applied from the controller 40 and drives the compressor 30 in response to a change in load.

In the compressor 30, a motor is driven by the AC power supplied from the inverter 20 to compress refrigerant and to discharge the compressed refrigerant to the heat-exchanger. Since the inverter 20 is operated by the switching control signal of the controller 40 and the AC power is input, when load is changed due to the refrigerating condition or the freezing condition and the compartment temperatures, the switching control signal of the controller 40 is varied so that compression degree and capacity of the compressor 30 are adjusted.

The voltage detecting unit 70 is connected to the power input unit 11 of the power supply 10 to measure a magnitude of a voltage of the input power and to apply the measurement to the controller 40. In this case, the voltage measured by the voltage detecting unit 70 is a voltage of the AC input power before being converted by the rectifying and smoothing unit 12, and is measured by a maximum voltage or a minimum voltage.

The rectifying and smoothing unit 12 rectifies the AC power input from the power input unit 11 through the half wave rectification or the full wave rectification, and smoothes the rectified power to convert the same into a DC voltage with a constant voltage. In this case, the rectifying and smoothing unit 12 rectifies the input power through the full wave rectification or the half wave rectification according to whether the connection of the switch unit 14 is changed.

The switch unit 14 is connected to the rectifying and smoothing unit 12 and the power input unit 11, and is switched in response to a control signal from the controller 40. Since the connection of the rectifying and smoothing unit 12 is changed by the connection of the switch unit 14, when the input power supplied from the power input unit 11 is supplied to the rectifying and smoothing unit 12, the current flow is changed so that the input power of the rectifying and smoothing unit 12 is differently rectified. In this case, the switch unit 14 is switched to a first voltage mode or a second voltage mode according to a control signal of the controller 40.

The controller 40 creates a switching control signal in response to refrigerating condition or freezing condition input and set by the input unit 50 and data input from the plural sensors, and applies the switching signal to the inverter 20 to drive the compressor 30. In this case, the controller 40 controls the display 60 to display the operating condition of the refrigerator and data for the operating state according to the data input from the plural sensors.

Moreover, the controller 40 controls the switch unit 14 in response to a magnitude of a voltage input from the voltage detecting unit 70. The controller 40 compares the magnitude of the voltage input from the voltage detecting unit 70 with a preset reference voltage, and creates control signals to provide the same to the switch unit 14 when the input voltage is greater than or less than the reference voltage.

When the voltage of the input power is greater than the reference voltage, the controller 40 controls the switch unit 14 to be switched to the first voltage mode and the input power to be rectified by the rectifying and smoothing unit 12 through the full wave rectification. When the voltage of the input power is less than the reference voltage, the controller 40 controls the switch unit 14 to be switched to the second voltage mode and the input power to be rectified by the rectifying and smoothing unit 12 through the half wave rectification.

In this case, the reference voltage to be compared with the measured voltage may be set by one of 110 V and 220 V in order to distinguish 110 V and 220 V. It is preferred that the reference voltage is set by an intermediate voltage between 110 V and 220 V by considering the measuring error and the determination error, and hereinafter a reference voltage of 165 V will be described. That is, the controller 40 determines the input power as 220 V when the voltage input from the voltage detecting unit 70 is equal to or greater than 165 V, as 110 V when the input voltage is less than 165 V, and creates control signals based on the determination.

Figure 3:
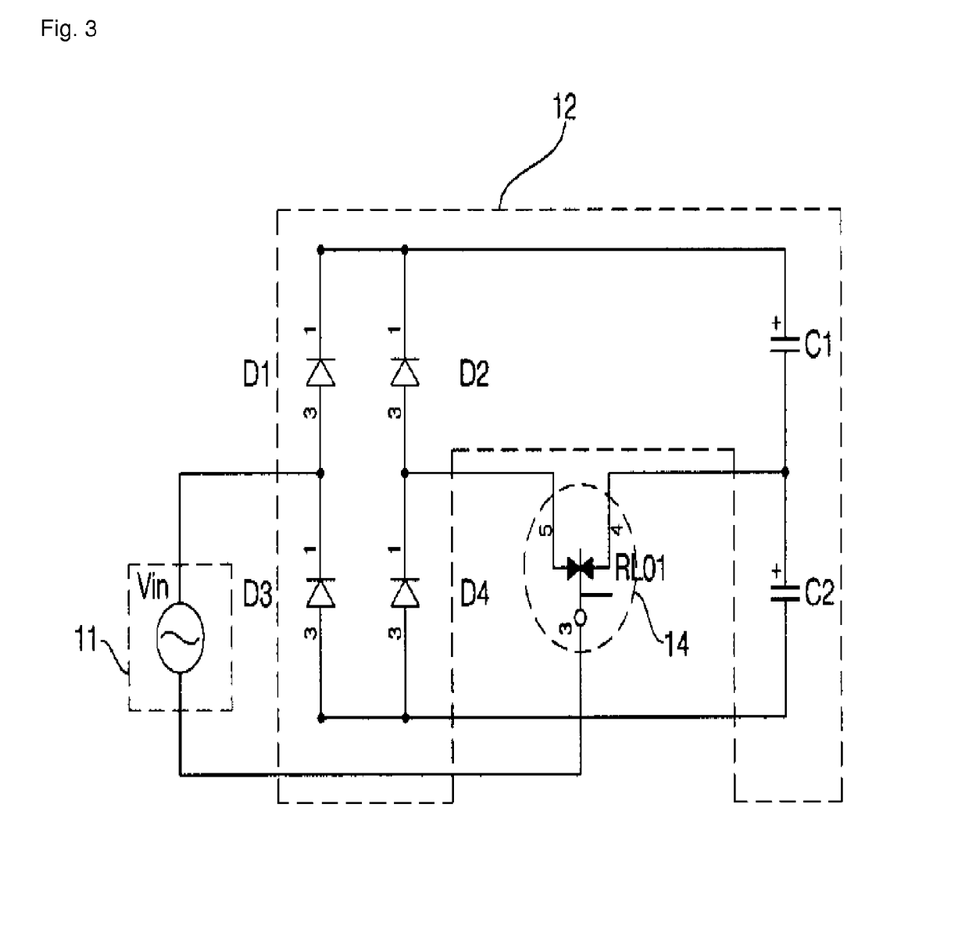
FIG. 3 is a circuit diagram illustrating a power supply and a switch unit of the refrigerator according to an embodiment of the present invention.

FIG. 3 is a circuit diagram illustrating a power supply and a switch unit of the refrigerator according to an embodiment of the present invention.

Referring to FIG. 3, an AC power Vin of a predetermined voltage is supplied to the power input unit 11. In this case, an end of the power input unit 11 is connected to the rectifying and smoothing unit 12 and the other end thereof is connected to the switch unit 14. The switch unit 14 is a switching device having at least three connecting terminals and includes a relay RL01. The switch unit 14 may use any switching device for changing the connection between the terminals in accordance with a control command from the controller 40, other than the relay.

The rectifying and smoothing unit 12 includes a plurality of diodes and a plurality of capacitors. Especially, the rectifying and smoothing unit 12 includes first to fourth diodes D1, D2, D3, and D4, a first capacitor C1, and a second capacitor C2. The first to fourth diodes D1 to D4 rectify the input power, and the first and second capacitors C1 and C2 smooth the rectified input power. The inverter connected to the first and second capacitors C1 and C2 is omitted from this description. Although the rectifying and smoothing unit 12 may further include at least one resistor for protecting the diodes and the capacitors, it is noted that the resistor is omitted from the drawings.

The first to fourth diodes D1 to D4 of the rectifying and smoothing unit 12 form a bridge rectifying circuit. That is, the first diode D1 an anode of which is connected to the power input unit 11 and a cathode of the third diode D3, and a cathode of which is connected to a cathode of the second diode D2 and a positive end (+) of the first capacitor C1. An anode of the second diode D2 is connected to a cathode of the fourth diode D4 and an anode of the fourth diode D4 is connected to an anode of the third diode D3.

A positive end (+) of the first capacitor C1 is connected to the cathode D1 and the cathode of the second diode D2, and a negative end (−) of the first capacitor C1 is connected to a positive end (+) of the second capacitor C2. A negative end (+) of the second capacitor C2 is connected to anodes of the third and fourth diodes D3 and D4.

The relay RL of the switch unit 14 is connected such that a first terminal 3 is connected to a negative end (−) of the power input unit 11, a second terminal 4 is connected to a negative end (−) of the first capacitor C1 and a positive end (+) of the second capacitor C2, and a third terminal 5 is connected to the anode of the second diode D2 and the cathode of the fourth diode D4.

In the switch unit 14, the first terminal 3 and the second terminal 4 are connected to each other or the first terminal 3 and the third terminal 5 are connected to each other by a control command from the controller 40. The switch unit 14 is switched such that the connection between the first to third terminals are changed, and the current flow through the rectifying and smoothing unit 12 is changed.

Figure 4:
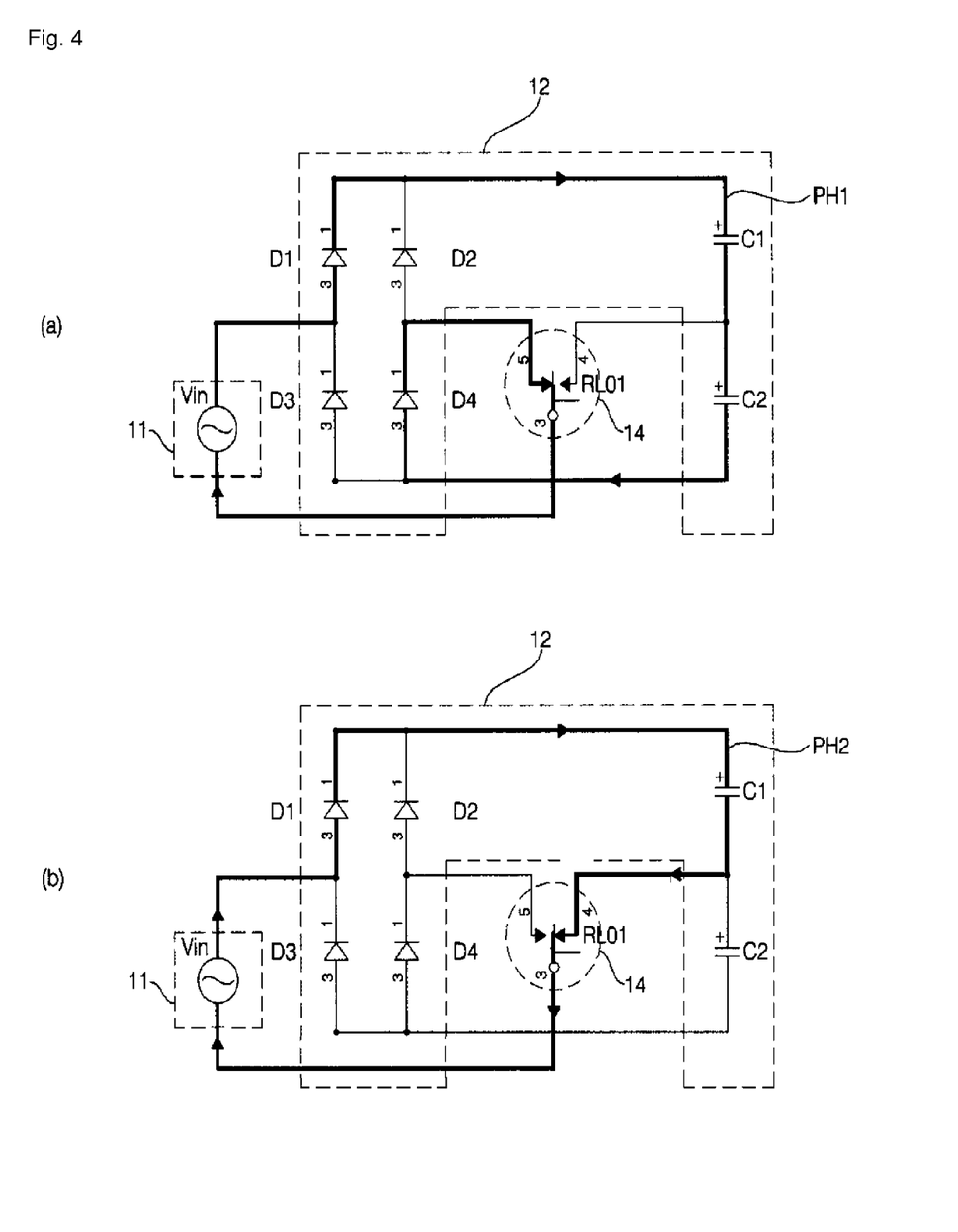
FIG. 4 is an exemplary view illustrating signal flows of the power supply when an input power is input to the refrigerator according to an embodiment of the present invention.

FIG. 4 is an exemplary view illustrating signal flows of the power supply when an input power is input to the refrigerator according to an embodiment of the present invention.

FIG. 4A illustrates the power supply and the switch unit in the first voltage mode, and FIG. 4B illustrates the power supply and the switch unit in the second voltage mode.

When the voltage measured by the voltage detecting unit 70 is greater than the reference voltage, the controller 40, as illustrated in FIG. 4, controls the switch unit 14 to connect the first terminal 3 and the third terminal 5 of the relay RL01 to each other.

As illustrated in FIG. 4A, in the first voltage mode where the measured voltage is greater than the reference voltage, the switch unit 14 connects the first terminal 3 to the third terminal 5.

When a voltage of the input power is positive (+), a current flows from the power input unit 11 to the first diode D1 and from the first diode D1 to the first capacitor C1 and the second capacitor C2. Moreover, the current flows from the second capacitor C2 to the third terminal 5 of the relay of the switch unit 14 via the fourth diode D4, and since the third terminal 5 is connected to the first terminal 3, the current flows to the negative end (−) of the power input unit 11 via the first terminal 3 (PH1).

Meanwhile, a voltage of the input power is negative (−), the current flows in a reverse direction with respect to the case where the voltage is positive (+).

When the current flows through the rectifying and smoothing unit 12 in the first voltage mode as described above, the input power is rectified through the full wave rectification.

In the second voltage mode where a voltage of the input power measured by the voltage detecting unit 70 is less than the reference voltage, as illustrated in FIG. 4B, the first terminal 3 and the second terminal 4 of the relay RL01 of the switch unit 14 are connected to each other.

When a voltage of the input power is positive (+), a current flows from the power input unit 11 to the first capacitor C1 via the first diode D1 and to the power input unit 11 via the second terminal 4 and the first terminal 3 of the relay RL01 (PH2).

Meanwhile, a voltage of the input power is negative (−), the current flows in a reverse direction with respect to the case where the voltage is positive (+).

When the current flows through the rectifying and smoothing unit 12 in the second voltage mode as described above, the input power is rectified through the half wave rectification.

As described above, when the current is rectified through the full wave rectification or the half wave rectification in correspondence with the voltage of the input power, the input power is converted as follows.

Figure 5:
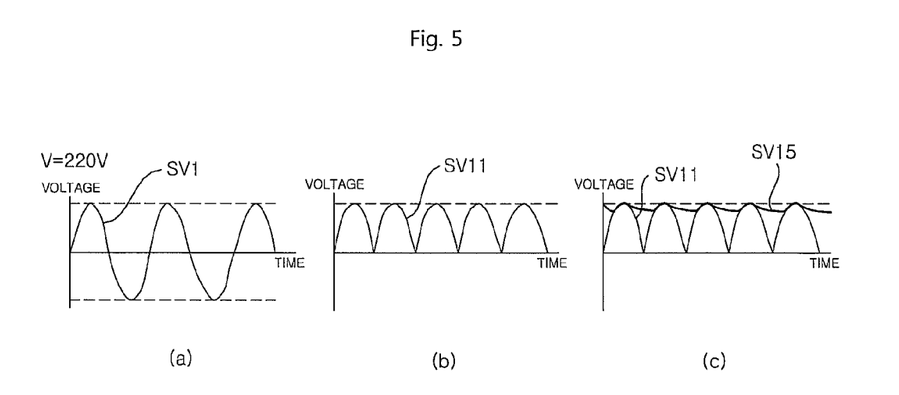
FIG. 5 is an exemplary view illustrating the rectification of the input power at a first voltage mode of the refrigerator according to an embodiment of the present invention.

FIG. 5 is an exemplary view illustrating signals of the rectification of the input power at the first voltage mode of the refrigerator according to an embodiment of the present invention.

As illustrated in FIG. 5A, when an AC power of 220V is input as an input power SV1, the voltage detecting unit 70 measures a voltage of the AC power. The voltage detecting unit 70 detects the maximum voltage or the minimum voltage and supplies an absolute value of the measured voltage to the controller 40. When the switch unit 14 is variably switched by the control command of the controller 40, as illustrated in FIG. 4A, the current flow through the rectifying and smoothing unit 12 is changed in the first voltage mode.

When the input power SV1 is supplied to the rectifying and smoothing unit 12, as illustrated in FIG. 4A, the input power is rectified through the full wave rectification, as illustrated in FIG. 5B, by the first to fourth diodes D1 to D4 (SV11). The rectified input power SV11 is smoothed by the first capacitor C1 and the second capacitor C2 as illustrated in FIG. 5C, and is converted into a DC power SV15 of a constant voltage. The converted input power is supplied to the inverter 20 and is re-converted into an AC power for driving the compressor 30.

Figure 6:
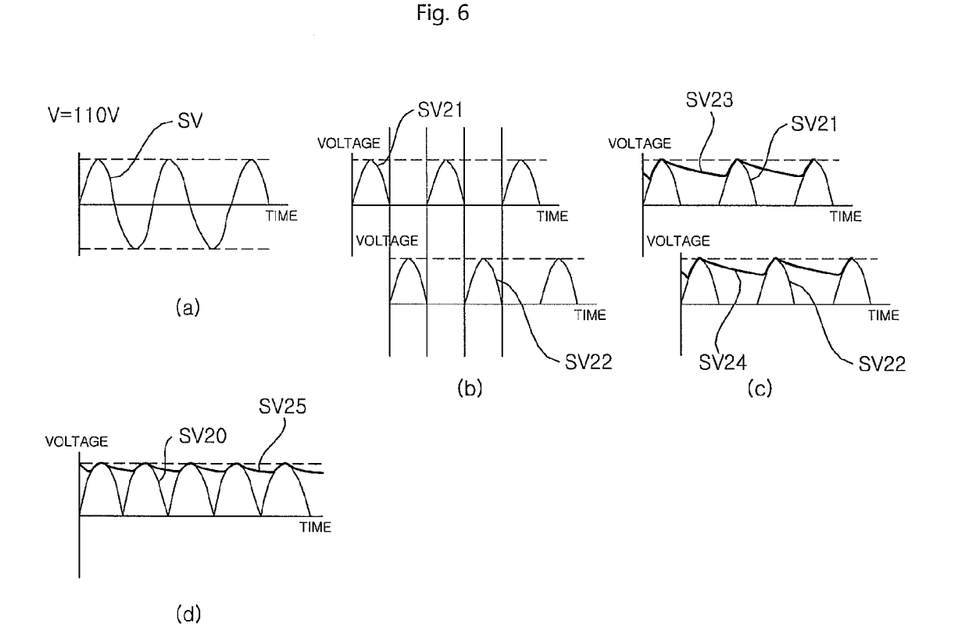
FIG. 6 is an exemplary view illustrating the rectification of the input power at a second voltage mode of the refrigerator according to an embodiment of the present invention.

FIG. 6 is an exemplary view illustrating signals of the rectification of the input power at a second voltage mode of the refrigerator according to an embodiment of the present invention.

When a voltage of the input power SV is less than the reference voltage, the rectifying and smoothing unit 12 is connected to the switch unit 14 in the second voltage mode as illustrated in FIG. 4B.

When an AC power of 100V is input as the input power SV as illustrated in FIG. 6A, the positive (+) and negative (−) AC powers are rectified through the half wave rectification by the first and second diodes D1 and D2 of the rectifying and smoothing unit 12, respectively, as illustrated in FIG. 6B (SV21, and SV22). The half wave rectified input powers SV21 and SV22 are smoothed, as illustrated in FIG. 6C, by the first capacitor C1 to be converted into DC powers of a constant voltage (SV23 and SV24). The smoothed input powers SV23 and SV24 are finally combined with each other so that a power SV25 as illustrated in FIG. 6D is output to the inverter 20.

When the half wave rectified input powers are finally combined in the second voltage mode, a DC power is output as the case of the first voltage mode.

Equation 1

$$\sqrt{2}\times 110+\sqrt{2}\times 110=\sqrt{2}\times 220$$

The combined voltage of the half wave rectified and smoothed input power of 110 V is the same as that of the full wave rectified and smoothed of an input power.

Figure 7:
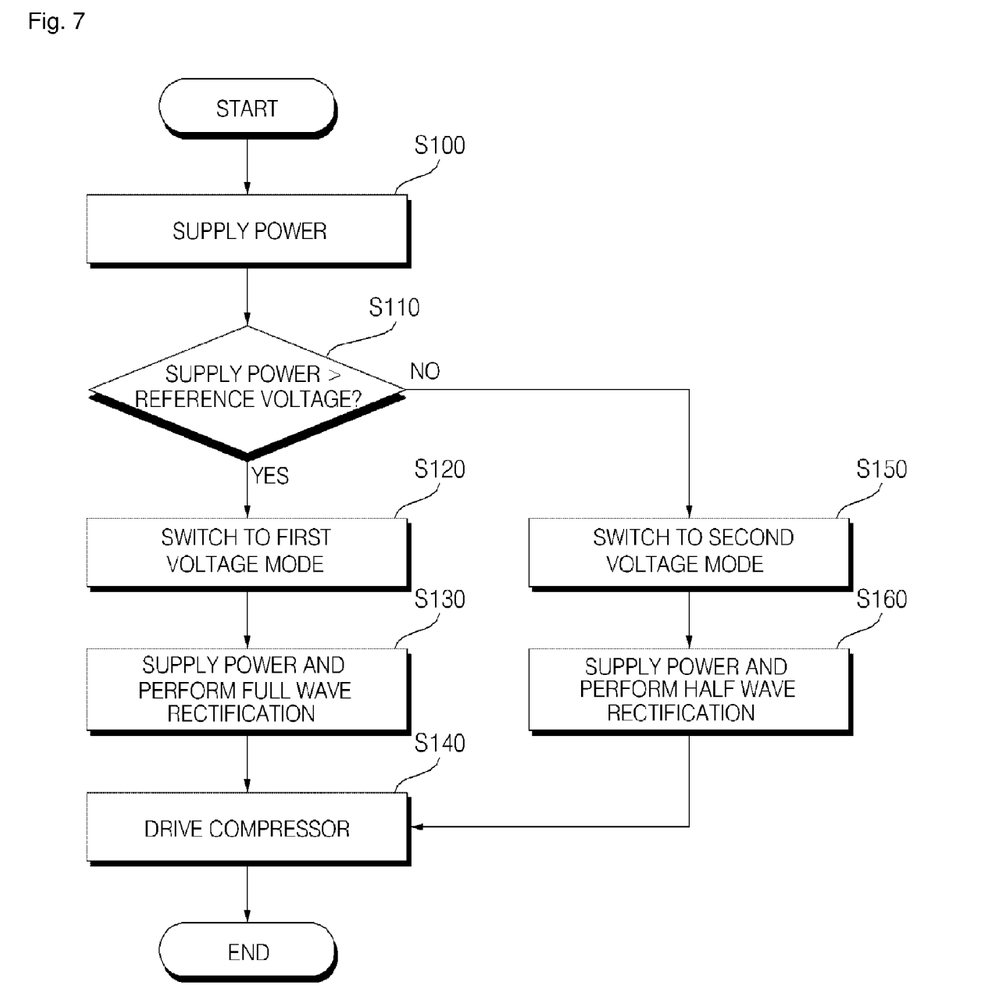
FIG. 7 is a flowchart illustrating a method of operating the refrigerator according to an embodiment of the present invention.

Operation of the present invention constructed as described above will be described as follows. FIG. 7 is a flowchart illustrating a method of operating the refrigerator according to an embodiment of the present invention.

When an AC power of a predetermined voltage as an input power is supplied to the refrigerator 1 (S100), the voltage detecting unit 70 measures a voltage of the AC power and supplies the measured voltage to the controller 40. In this case, the voltage measured by the voltage detecting unit 70 is one of the maximum voltage or the minimum voltage of the AC power, and the controller compares an absolute value of the measured voltage with a preset reference voltage (S110). Although the reference voltage may be determined by one of 110 V to 220 V, it is preferred that an intermediate voltage from 110 V to 220 V by considering the measuring error.

When the measured voltage of the input power is greater than the reference voltage, the controller 40 determines a control mode as the first voltage mode and controls the switch unit 14 is switched to the first voltage mode (S120). At this time, in the relay RL01 of the switch unit 14, the first terminal and the third terminal are connected to each other.

When the switch unit 14 is switched to the first voltage mode, the input power is supplied to the rectifying and smoothing unit 12 as illustrated in FIG. 4A to be rectified and smoothed as illustrated in FIG. 5 (S130) and a DC power is output to the inverter 20.

Meanwhile, when the measured voltage of the input power is less than the reference voltage, the controller 40 controls the switch unit 14 to be switched to the second voltage mode. In the switch unit 14, the first terminal and the second terminal of the relay RL01 are connected to each other by the control signal of the controller 40 (S150).

When the switch unit 14 is switched to the second voltage mode, the input power is supplied to the rectifying and smoothing unit 12 as illustrated in FIG. 4B to be rectified through the half wave rectification as illustrated in FIG. 6 (S160) and to be smoothed, and a DC power is output to the inverter 20.

When the inverter 20 is operated by the switching control signal generated by the controller 40, the power converted into the DC power by the rectifying and smoothing unit 12 is re-converted into an AC power to be supplied to the compressor 30 so that a compressor motor is driven to drive the compressor (S140). When the compressor is driven, the refrigerant circulates so that the chilled air is supplied into the refrigerator compartments and the freezer compartments of the refrigerator 1.

Although a refrigerator and a method of operating the same according to the present invention have been described with reference to the embodiment shown in the drawings, these are merely illustrative, and those skilled in the art will understand that various modifications and equivalent other embodiments of the present invention are possible. Consequently, the true technical protective scope of the present invention must be determined based on the technical spirit of the appended claims.

INDUSTRIAL APPLICABILITY

According to a refrigerator and a method of operating the same according to the present invention, a voltage of an electric power input to a refrigerator is measured and a current flow through a rectifying and smoothing unit is variably controlled in correspondence with the measured voltage to rectify the input power through the half wave rectification or the full wave rectification, so that a same power supply circuit can be used in other regions without change or modification. Therefore, the change or the modification of the circuit is not needed in order to use the refrigerator in other regions. Since components are compatible and utility of the components is improved, manufacturing costs can be reduced.

The invention claimed is:

1. A refrigerator comprising:
   a voltage detector that measures a voltage of an input power;
   a rectifying and smoothing circuit that rectifies the voltage of the input power through a half wave rectification or a full wave rectification, and that smoothes the rectified voltage of the input power;
   a switch coupled to the rectifying and smoothing circuit, the switch changing a current flow through the rectifying and smoothing circuit; and
   a controller that compares a voltage magnitude of the input power inputted from the voltage detector with a preset reference voltage,
   wherein the preset reference voltage is a stored intermediate value between a first standard wall outlet voltage and a second standard wall outlet voltage,
   wherein the controller controls the switch such that the voltage of the input power is rectified through the full wave rectification when the voltage magnitude of the input power is greater than the preset reference voltage, and
   wherein the controller controls the switch such that the voltage of the input power is rectified through the half wave rectification when the voltage magnitude of the input power is less than the preset reference voltage.

2. The refrigerator of claim 1, wherein the rectifying and smoothing circuit comprises:
   a plurality of diodes for forming a bridge rectifying circuit; and
   a plurality of capacitors connected to the plurality of diodes.

3. The refrigerator of claim 2, wherein the switch comprises:
   a first terminal connected to second and fourth diodes of the plurality of diodes to be connected serially to each other;
   a second terminal connected to first and second capacitor of the plurality of capacitors; and
   a third terminal connected to the input power.

4. The refrigerator of claim 3, wherein the switch comprises a relay having at least three terminals.

5. The refrigerator of claim 3, wherein the controller controls the switch such that the first terminal and the third terminal are connected to each other when the voltage magnitude of the input power measured by the voltage detector is greater than the reference voltage, and that the third terminal and the second terminal are connected to each other when the voltage magnitude of the input power is less than the reference voltage.

6. A method of operating a refrigerator comprising a rectifying and smoothing circuit that rectifies and smoothes an input power, an inverter, and a compressor, the method comprising:
   measuring a voltage of the input power to compare the measured voltage with a preset reference voltage;

switching a switch connected to the rectifying and smoothing circuit to a first voltage mode when the voltage of the input power is greater than the preset reference voltage;

switching the switch connected to the rectifying and smoothing circuit to a second voltage mode when the voltage of the input power is less than the preset reference voltage;

rectifying the input power through the full wave rectification and smoothing the rectified input power when the switch is on to the first voltage mode;

rectifying the input power through the half wave rectification and smoothing the rectified input power when the switch is on to the second voltage mode; and converting the rectified and smoothed input power by the inverter to be supplied as a driving power to the compressor, wherein the preset reference voltage is a stored intermediate value between a first standard wall outlet voltage and a second standard wall outlet voltage.

7. The method of claim 6, further comprising switching the switch to the first voltage mode such that the rectifying and smoothing circuit is changed into a full wave rectifying and smoothing circuit.

8. The method of claim 6, further comprising switching the switch to the second voltage mode such that the rectifying and smoothing circuit is changed into a half wave rectifying and smoothing circuit.

* * * * *